J. GRAY.
Ice Cream Freezer.
No. 68,734.
Patented Sept. 10, 1867.
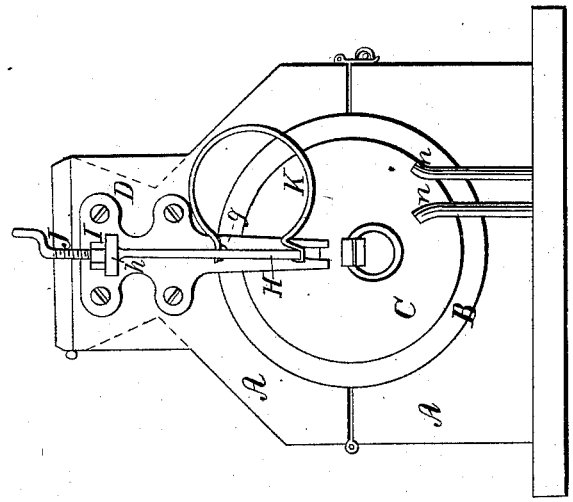
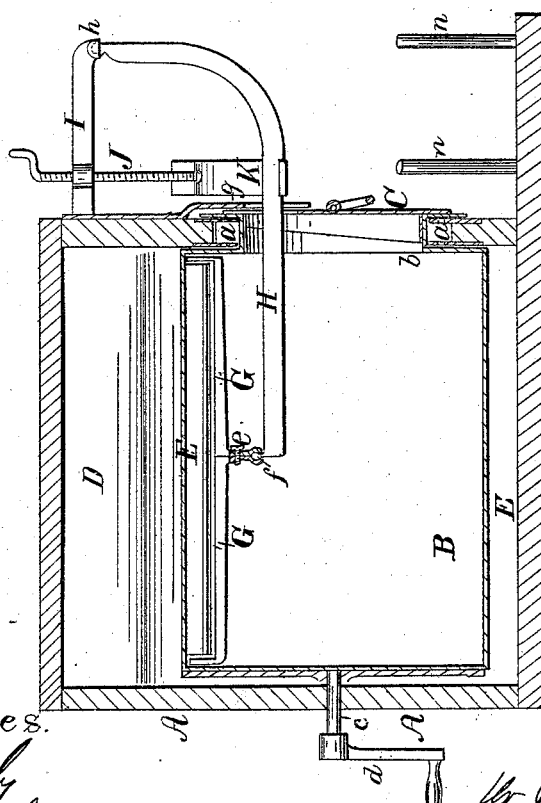
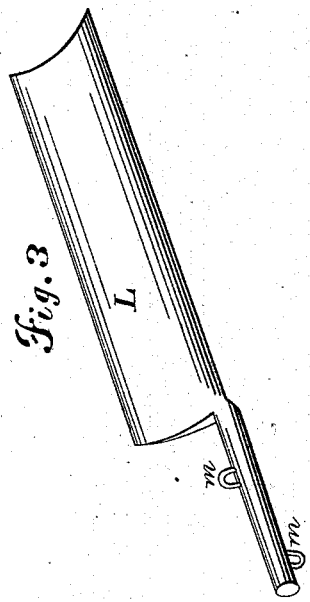

United States Patent Office.

JOHN GRAY, OF MILWAUKEE, WISCONSIN.

Letters Patent No. 68,734, dated September 10, 1867.

IMPROVED ICE-CREAM FREEZER.

The Schedule referred to in these Letters Patent and making part of the same.

TO ALL WHOM IT MAY CONCERN:

Be it known that I, JOHN GRAY, of Milwaukee, in the county of Milwaukee, and State of Wisconsin, have invented certain new and useful Improvements in Ice-Cream Freezers, of which the following is a full, clear, and exact description, reference being had to the accompanying drawing, forming part of this specification, and in which—

Figure 1 represents an end elevation of an ice-cream freezer constructed according to my improvement.

Figure 2, a vertical longitudinal section of the same.

Figure 3, a view in perspective of a scraper or gatherer used in connection with the machine.

Similar letters of reference indicate corresponding parts.

The nature of my invention consists in the combination with the freezing-cylinder of a roller for operation within the cylinder; likewise in a certain socketed suspension of said roller and support of it against the interior of the cylinder by a spring; and furthermore in a novel combination and action of a gatherer or scraper to the cylinder for collecting the iced cream or milk therein, all substantially as hereinafter described.

Referring to the accompanying drawing, A A' is a box or case, or upper and lower sections, constituting, when united, a box or case, both sections being suitably lined and made close at their one end, but with semi-circular openings at their opposite end, which form, when the two sections are closed the one upon the other by, say, a hinged attachment of the upper section A to the lower section A', a circular opening or neck, in which is arranged a series of anti-friction or carrying rollers $a\ a$ for support, at its one end, of a horizontally arranged or but slightly inclined and rotating, say, metallic freezing or icing-cylinder B, that has a necked construction, $b$, at such end to run upon the rollers, and is closed by a lid, C, while its other end may be carried by a gudgeon or shaft, $e$, for setting the freezer or cylinder in motion by means of a crank, $d$, or pulley, as preferred. The upper section is provided with a hopper, D, at top, covered, it may be, by a lid, for insertion of the frigerific mixture, which is thus allowed to pass round and lie within an annular space, E, surrounding the cylinder B. The cream or milk is admitted through the neck $b$, on removing the lid C, to any depth in the cylinder not exceeding in height the bottom of the neck or opening $b$, more cream or milk being added, if necessary, from time to time, while the cylinder is in motion, as previous supplies thereto become frozen. F is a wooden or other suitable roller arranged to occupy an upper longitudinal position within the cylinder, in contiguity to its interior, in which position it is held or supported in a free or adjustable manner by, say, hanging it through trunnions in a frame or holder made up of bars or frame pieces G G bolted together, as at $e$, and forming a socket-joint or clip to or on a cross-pin, $f$, made fast to the end of a lever, H, which is arranged to project through a slot in the cylinder cover and through a slotted guide, $g$, made fast to the upper box section A. Thus protruding through the freezing-cylinder, the outer end portion of said lever H is bent upward and made to bear, by a cross-pin or gudgeons, on or in a socket, $h$, of a fixed arm, I, that further carries or has working through it a vertical screw, J, to give adjustability to the force or tension of a spring, K, on which the lever H is made to bear or rest outside of the freezing-cylinder and its box. The socketed attachment of the lever H to the roller frame or holder G G should be such as, while allowing of the requisite freedom in play to the roller, the latter or its holder will not become detached from said lever, which, on opening the lid C, may be lifted out of the cylinder together with the roller by releasing hold of the spring K on said lever and unshipping it from the socket $h$. Supposing the roller F to be in place, as represented, the cylinder B supplied with cream or milk, as described, and hopper D and annular space E to have furnished them the requisite amount of frigerific mixture, then, on rotating said cylinder, the cream or milk adhering to the cold or freezing interior surface of the cylinder, will, as the icing commences, be carried up and against the roller F, and to a small extent it may be over it, but the greater portion of which will, by the action of the spring K on the roller, be forced back and caused to drop through the cold interior space or body of the cylinder back into the milk or cream below, and this process or action continued till the whole is iced. By means of the screw J the pressing power of the spring on the roller may be gradually increased and adjusted, as required. To rework ice-cream which has been heavily iced any suitable lock or stop may be put upon the roller F to prevent it turning. Hung as described, said roller, it will be perceived, has every convenience afforded it for self-adjustment to meet different thickness of cream, or varying quantities of it, as lifted at or by different portions of the cylinder. To collect the ice-cream after it has been formed, the bar H, with its roller attachment, may be removed and a gatherer or scraper, L. be inserted through the neck $b$, said gatherer consisting of a blade running, when inserted, say the length of the cylinder and shank provided with eyes or loops $m$ $m$, which are made to freely fit in a sliding manner vertical stationary guides, $n$ $n$, arranged, say, as represented in fig. 1, and by which means the gatherer, as it comes in contact with the ice-cream, is guided evenly downward. By this my improvement ice-cream or milk may be produced both rapidly and economically.

As before observed, it is not in all cases essential that the roller F should turn, under which condition it might be more correct to speak of it as a bar. Not only in the instance before referred to, but in small machines, it may be preferable to lock or secure it from rotating.

What is here claimed, and desired to be secured by Letters Patent, is—

1. The combination, with the rotating cylinder B and outer box or case containing frigorific mixture, of a roller, F, arranged for operation within the cylinders, substantially as and for the purpose herein set forth.

2. Suspending the roller F in a free or adjustable manner by a socketed support of the same for adjustment of the latter relatively to the interior of the rotating cylinder B, essentially as specified.

3. The combination of the roller F and its frame with the bar H, supported by a spring, the tension of which may be regulated by a screw, for operation in connection with a rotating freezing cylinder, substantially as herein set forth.

4. The gatherer L, constructed and applied for action within the cylinder B by means of outside guides on or down which said gatherer is allowed to freely slide, essentially as and for the purpose specified.

JOHN GRAY.

Witnesses:
 HENRY C. RUNKEL,
 G. D. PHELPS.